May 8, 1962 W. J. ROGERS 3,032,990
FUEL NOZZLE FOR GAS TURBINE ENGINE
Filed Oct. 1, 1959
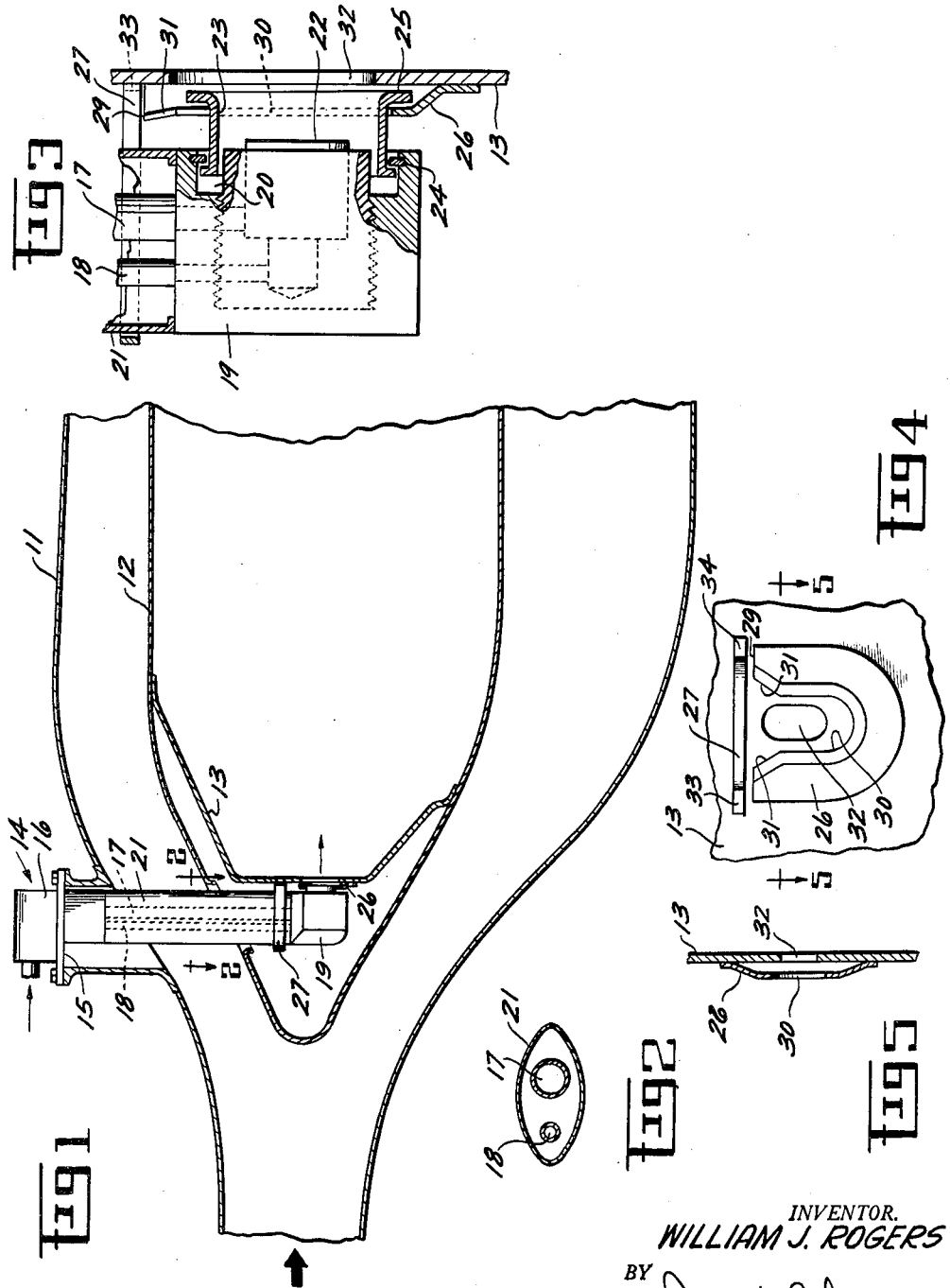
INVENTOR.
WILLIAM J. ROGERS
BY Robert B. Crowell
ATTORNEY—

United States Patent Office 3,032,990
Patented May 8, 1962

3,032,990
FUEL NOZZLE FOR GAS TURBINE ENGINE
William J. Rogers, Cincinnati, Ohio, assignor to General
Electric Company, a corporation of New York
Filed Oct. 1, 1959, Ser. No. 843,733
1 Claim. (Cl. 60—39.74)

The present invention relates to a fuel nozzle for use in a gas turbine engine and more particularly to a fuel nozzle which is readily assembled in its proper position relative to the engine combustion liner.

Fuel nozzles available for use in gas turbine engines have in the past had several shortcomings which have limited engine performance. These fuel nozzles have been designed to be assembled by insertion radially through an opening in the outer casing of the engine and then introduction of the nozzle tip axially of the liner into a ferrule which is loosely mounted in an opening in the combustion liner. The nozzle is then bolted to the outer casing. This is a blind installation which has required movement both radially and axially of the liner without visual observation during assembly. Since there is no provision for checking the position of the nozzle tip after the nozzle is assembled, errors have frequently been made in positioning the nozzle tip relative to the liner. These errors have resulted in serious damage to the nozzle and the liner. In some cases a nozzle has been forced into position with the nozzle tip outside the ferrule. In these cases the nozzle has been damaged and fuel has been sprayed against and burned on the outer surface of the liner. Whenever burning takes place on the surface of the liner a hole is soon burned in the liner and it must be replaced. A conventional fuel nozzle has an externally sealed joint between the nozzle tip and the metering set which defines the fuel discharge orifices. When such a fuel nozzle is jammed against the surface of a liner the joint seal is often damaged and fuel is released into the air space surrounding the liner. When this fuel is deposited on the outer surface of the liner it is burned with the result just described.

An object of the present invention is to provide an improved fuel nozzle for modern gas turbine engines which is easily assembled in its proper position and which confines fuel delivery to the interior of the combustion liner.

The above object is realized in the present invention by provision of a fuel nozzle, the longitudinal axis of which is a straight line to permit installation by radial movement only. The nozzle of the present invention has a metering set received within the nozzle tip, so that fuel leakage is discharged into the interior of the liner. The nozzle tip itself and a bushing thereon cooperate with a guide clip and a retaining clip on the liner to position the metering set in line with a fuel entry opening in the liner.

Other objects and many of the attendant advantages of this invention will be readily appreciated as the same becomes better understood by reference to the following detailed description when considered in connection with the accompanying drawings wherein:

FIGURE 1 is an elevation view partly in section of a fuel nozzle according to the present invention assembled in position in the combustion section of a gas turbine engine;

FIGURE 2 is a cross-sectional view taken along lines 2—2 of FIGURE 1;

FIGURE 3 is a fragmentary elevational view at an enlarged scale showing the connection between the fuel nozzle tip and the combustion liner.

FIGURE 4 is an elevation view of the retainer clip and the guide clip; and

FIGURE 5 is a cross-sectional view of the retainer clip taken along lines 5—5 of FIGURE 4.

Referring more particularly to FIGURE 1 of the drawing, a portion of a gas turbine engine combustion section is illustrated as including an outer casing 11 and a combustion liner 12 positioned concentrically therewithin. The combustion liner confines the combustion process and includes a dome 13 which defines the upstream extremity of the liner. A fuel nozzle 14 extends through an opening 15 in the outer casing into cooperative relation with the dome 13. The fuel nozzle includes a flow divider housing 16, fuel tubes 17 and 18 which are straight throughout their length and are connected to the housing, and a nozzle tip 19 connected to the fuel tubes at a point remote from the housing. A tubular shield 21 surrounds the tubes and is connected to the housing and the nozzle tip.

As illustrated in FIGURE 3, the nozzle tip 19 is provided with an opening 20 on one surface which extends at right angles to the longitudinal axis of the nozzle in a downstream direction. A metering set 22 is secured within opening 20 by any suitable means, such as screw threads or by-pass fitting and then brazing or welding. A cylindrical bushing 23 is mounted on the nozzle tip in concentric relation with the metering set by means of a snap ring 24 received within the outer portion of opening 20. The cylindrical bushing 23 surrounds the metering set and extends downstream thereof. The bushing is provided with an annular flange 25 on its downstream extremity. The bushing cooperates with a retaining clip 26 which is illustrated in FIGS. 4 and 5 along with a guide clip 27. The retaining clip 26 is secured to the outer surface of the combustor dome 13 by welding or otherwise securing the edges of the clip to the material of the dome. The central portion of the clip and the radially outer edge 29 are spaced from the dome as shown in FIG. 5. The central portion is slotted as at 30 and the radially outer edges of the slot are beveled as at 31. A fuel entry port 32 is provided in the dome in line with the slot 30. Guide clip 27 is a horseshoe shaped member defining an opening only slightly larger than the nozzle tip and which is radially aligned with slot 30. The extremities of the clip are provided with flanges 33 and 34 which are secured to the combustion liner in a manner similar to the retaining clip.

Slot 30 in retaining clip 26 is aligned axially of the engine with the fuel entry port 32 and is also aligned in a radial direction with opening 15 in the outer casing and with guide clip 27. Accordingly, nozzle 14 may be assembled in position merely by inserting the end of the nozzle into the opening 15 and then letting it slide radially through the guide clip 27 and into position. As the nozzle is inserted radially through opening 15, the nozzle tip strikes the guide clip. When the nozzle tip slides through the guide clip the bushing 23 will be aligned with slot 30. The bushing then strikes the beveled edges of the slot which guide it into position within the slot. Since slot 30 is only slightly larger than the external diameter of the bushing, the bushing is maintained in place by flange 25 which under-lies the edges of the slot. When the nozzle is in its assembled position, the metering set 22 is positioned in line with the entry port 32 such that the fuel is sprayed through the port into the interior of the dome. If the nozzle tip does not slide through the opening defined by the guide clip, the nozzle cannot be forced into its assembled position.

The radial design of the present invention not only permits the fuel nozzle to be readily assembled under visual observation, but also allows for radial expansion of the liner. By allowing a small initial space between the bushing 23 and the bottom of slot 30 the radial growth of the liner during engine operation is accommodated. Port 32 is elongated in a radial direction to allow for the relative movement between the liner and the nozzle tip. In addition to avoiding the possibility of mis-assembly the present invention materially reduces the incidence of liner damage due to fuel leakage from the nozzle tip. By dispensing with the external joint between the metering set and the nozzle tip, applicant avoids releasing fuel into the air space around the liner. If leakage occurs in the present invention the fuel flows around the metering set and is discharged through bushing 23 into the fuel entry port.

If the fuel nozzle of the present invention is intended for aircraft gas turbine engine use at subsonic flight speeds, the shield 21 may be omitted. However, at supersonic flight speeds the heat transfer from the air flowing past the nozzle will cause the fuel to break down, leaving deposits of coke and gum in the nozzle. Since the heat shield extends between the flow divider housing and the nozzle tip, it can be readily secured to one (as by welding, brazing, etc.) and crimped around the other to allow for any differential expansion. A blanket of dead air is confined by the shield about the fuel tubes despite a temperature differential of approximately 800° F. between the fuel in tubes 17 and 18 and the air flowing past the nozzle. Tests have indicated a heat transfer in the vicinity of only 30° F.

Obviously many modifications and variations of the present invention are possible in the light of the above teachings. It is therefore to be understood that within the scope of the appended claim, the invention may be practiced otherwise than as specifically described.

What is claimed is:

In combination with a gas turbine engine combustion liner, a fuel nozzle including: a flow divider housing; a nozzle tip having a single centrally-located fuel discharge orifice; a pair of straight fuel tubes secured at their opposite extremities to the housing and to the nozzle tip, said tubes being in flow communication with said orifice; a tubular heat shield secured to the tip and the housing and enclosing the fuel tube, the heat shield confining a blanket of dead air about the fuel tube to minimize the transfer of heat thereto; a dome portion in said liner having a fuel port; an opening in said liner in communication with said dome portion; a retaining clip secured to said liner, said clip having a slot therein aligned with said port; a guide clip, said guide clip including an aperture aligned with said slot; a bushing mounted on the nozzle tip and surrounding said orifice, said bushing protruding from the nozzle tip to confine the fuel emitted from the nozzle tip to insure against leakage outside said liner, said bushing protruding to an extent such that said tip and bushing can be moved directly radially through said liner opening and guide clip aperture, the bushing being received within the retaining clip slot to align the discharge orifice with said fuel port.

References Cited in the file of this patent

UNITED STATES PATENTS

| | | |
|---|---|---|
| 1,869,242 | Frame | July 26, 1932 |
| 2,265,268 | Culligan | Dec. 9, 1941 |
| 2,422,214 | Meyer | June 17, 1947 |

FOREIGN PATENTS

| | | |
|---|---|---|
| 663,485 | Great Britain | Dec. 19, 1951 |
| 694,448 | Great Britain | July 22, 1953 |